(12) United States Patent
Bettenwort et al.

(10) Patent No.: US 7,471,073 B2
(45) Date of Patent: Dec. 30, 2008

(54) METHOD OF FINDING A MAXIMUM POWER OF A PHOTOVOLTAIC GENERATOR

(75) Inventors: Gerd Bettenwort, Kassel (DE);
Christian Kühnel, Kassel (DE); Oliver Arend, Lohfelden (DE); Joachim Ralf Laschinski, Kassel (DE); Gerald Alexander Leonhardt, Kassel (DE); Wolfgang Kurt Reichenbächer, Staufenberg (DE)

(73) Assignee: SMA Technologie AG, Niestetal (DE)

( * ) Notice: Subject to any disclaimer, the term of this patent is extended or adjusted under 35 U.S.C. 154(b) by 263 days.

(21) Appl. No.: 11/484,407

(22) Filed: Jul. 11, 2006

(65) Prior Publication Data

US 2007/0027644 A1 Feb. 1, 2007

(30) Foreign Application Priority Data

Jul. 14, 2005 (DE) .................. 10 2005 032 864

(51) Int. Cl.
*G05F 5/00* (2006.01)
(52) U.S. Cl. .................. 323/299; 323/906; 307/115
(58) Field of Classification Search ......... 323/282–288, 323/299, 906, 300, 222; 307/113, 115; 320/101, 320/141, 163
See application file for complete search history.

(56) References Cited

U.S. PATENT DOCUMENTS 4,794,272 A * 12/1988 Bavaro et al. ............... 307/66
6,316,925 B1 * 11/2001 Canter .......................... 323/282

FOREIGN PATENT DOCUMENTS

| DE | 43 25 436 | 2/1995 |
|---|---|---|
| DE | 199 04 561 | 8/2000 |
| DE | 199 09 609 | 9/2000 |
| DE | 100 60 108 | 6/2002 |

OTHER PUBLICATIONS

A Study on a Two Stage Maximum Power Point Tracking Control of a Photovoltaic System under Partially Shaded Insolation Conditions; K. Kobay Ashi u.a., In: IEEE Power Engineering Society General Meeting, vol. 4, S. 2613-2617, Jul. 2003.
Response of Fibonacci-search-based Maximum Power Point Tracker when a Photovoltaic Array is Partially Shaded; M. Miyatake u.a., In: Proceeding Power and Energy Systems, EuroPES 2003, ISBN: 0-88986-366-5, Sep. 2003.

* cited by examiner

*Primary Examiner*—Rajnikant B Patel
(74) *Attorney, Agent, or Firm*—Jordan and Hamburg LLP

(57) ABSTRACT

A method of finding a power maximum of a photovoltaic generator using an MPP regulator of a photovoltaic current converter by means of which a maximum generator power is set at an operating point of the generator's characteristic curve is intended to supply improved efficiency when the generator is partially shadowed. This is achieved by switching the MPP regulator off in order to next load and/or unload the generator to allow a new operating point of the generator's characteristic curve to set and by next switching the MPP regulator on again.

11 Claims, 8 Drawing Sheets

METHOD OF FINDING A MAXIMUM POWER OF A PHOTOVOLTAIC GENERATOR

This application claims Priority from German Application No. 0 2005 032 864.4-32 filed on 14. Jul. 2005

BACKGROUND OF THE INVENTION

1. Field of the Invention

The invention relates to a method of finding a maximum power point of a photovoltaic generator.

Photovoltaic generators have characteristic power curves generally including a maximum power operating point. A certain generator current and a certain generator voltage are associated with this operating point.

Methods are known, by which the generator load, e.g., the generator current, is set so that the photovoltaic generator is operated at maximum power.

Such type methods are referred to as Maximum Power Point Tracking (MPPT).

2. Description of the Prior Art

A method presented in DE 199 04 561 C1 consists in utilizing an additional sensor that measures the incoming radiation and sets a maximum power through a characteristic curve measuring circuit and a microcomputer. If a shadow falls onto the sensor or if part of the generator is shadowed, an operating point is created that will not supply maximum power, this causing the energy efficiency of the system as a whole to drop.

Another method is known from DE 199 09 609 C1. Herein, no sensor is utilized but the generator's characteristic curve is measured directly by making use of a capacitor. A microcomputer serves to set the optimal operating point acquired. If however a generator part is shadowed, a plurality of local power maxima, which may have different heights, can occur. Therefore, it may happen that the power output by a partially shadowed generator will not be at its maximum and that part of the solar energy will not be used.

Another method for setting the maximum power point of a solar generator in a photovoltaic array is described in DE 100 60 108 A1. The peak of maximum power is set by measuring the physical parameters of the generator once as long as it is not partially shadowed.

The document DE 4325436 C2 describes a method by which the generator is periodically short-circuited and unloaded. The disadvantage of this method also is that partial shadowing is not recognized.

BRIEF SUMMARY OF THE INVENTION

It is the object of the invention to operate a PV generator so as to allow maximum energy output.

The invention makes it possible to increase the energy efficiency of a system consisting of a photovoltaic generator and a current power converter when the generator is partially shadowed and when conventional MPPT maximum regulation is doomed to fail because of a plurality of maxima in the characteristic curve of the generator.

The invention relies on the realization that a plurality of local power maxima of different heights may also appear with partial shadowing effects.

The invention is based on the idea that the problem of partial shadowing may be solved by creating on purpose an instable regulation and by re-creating a stable regulation as well as by evaluating the thus obtained measurement results. In principle, any regulation is suited as long as it allows for switching between a stabilizing and a non-stabilizing effect.

Basically, the solution of the invention can also be realized without standard MPP Tracking and may even replace MPP Tracking altogether.

By selective interference in the regulation loops of the power converter, instability is produced so that, almost without delay, a new operating point is set, which is near a local or global maximum if this maximum corresponds to a higher power than the power maximum detected before.

If the voltage difference between the new stable operating point and the operating point before creating the instability is sufficiently high, this operating point is near a maximum corresponding to a higher power, and this is detected.

The method serves to find the left side maximum. After selective interference in the regulation loops, the last measured power can be multiplied by a factor greater than one and be imposed as a desired value for regulation. Instability is generated in this way. If there is still stability, power is increased until instability occurs. In order to find an additional left side maximum, the procedure performed before can be repeated. The number of repetitions corresponds to the number of left side maxima with increased power and can be limited. If the voltage difference between the respective newly formed stable operating point and the last stable operating point is high enough, this operating point is near a maximum corresponding to a higher power, and this is detected.

The method also serves to find a right side power maximum by creating instability. After selective interference in the regulation loops, the last measured power is multiplied by a factor near zero and is imposed as the desired value for a time of e.g., less than a second. The system can be unloaded in this way. Next, a power is imposed as the desired value that is within a range of values from before the interference in the regulation loops. If the voltage difference between the newly set stable operating point and the operating point before the instability was created is sufficiently high, this operating point is near a maximum corresponding to a higher power, and this is detected. If the voltage difference between the newly set stable operating point and the operating point before the instability was created is sufficiently small, this operating point is near the initial power maximum and there is no additional right side maximum, and this is detected.

If a new operating point at higher power is detected, the new operating point is transmitted to the regulator as the starting value and the initial regulation loops are formed so that the system is capable of setting the new operating point corresponding to higher power, almost without vibrations.

By setting the number of left side maxima to be tracked, tracking can be matched with the shadowing sensitivity of the generator.

Another advantageous implementation of the method of the invention is characterized by the fact that the power of the power converter is increased after interference in the regulation loops so that a first operating point of a power characteristic curve that corresponds to a global maximum moves toward a second operating point located near point zero of the curve. This method is advantageous with a local left side maximum.

Another advantage is that, after interference in the regulation loops, the power of the power converter is reduced so that a first operating point of a power characteristic curve that corresponds to a global maximum moves toward a second operating point located near the generator's idle voltage. This permits setting a local right side power maximum.

In an advantageous developed implementation of the invention, there is provided that, after interference in the regulation loops, the power of the power converter is reduced so that a first operating point of a power characteristic curve that corresponds to a local maximum moves toward a second operating point located near the generator's idle voltage, a third operating point occurring once the power has been increased, said third operating point being as high as the first operating point and near a fourth operating point, which is a power maximum. This method takes into consideration a right side maximum of increased power.

Further advantageous implementations of the invention are characterized in the dependent claims.

An exemplary embodiment for operating a DC-AC inverter will be discussed in greater detail with reference to the drawings, further advantageous developed implementations of the invention and advantages thereof being described therein.

DETAILED DESCRIPTION OF THE INVENTION

Figure 1:
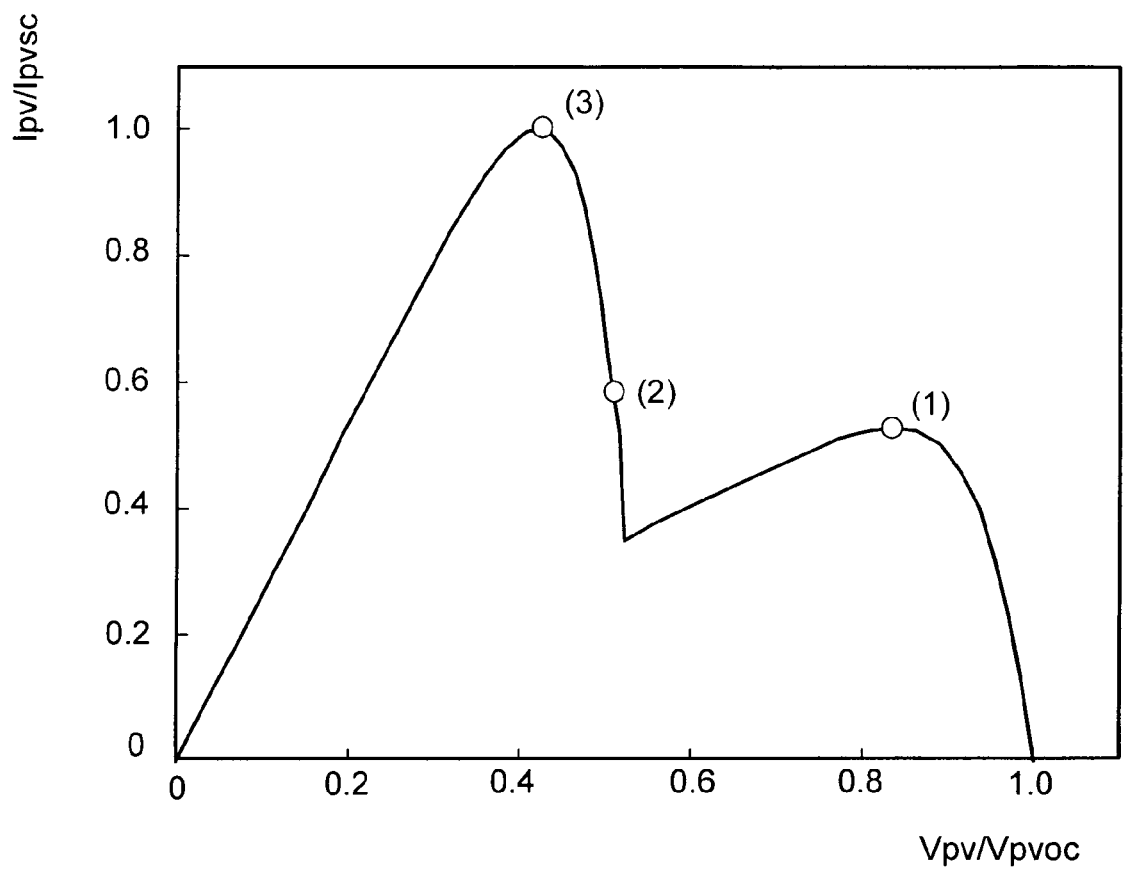
FIG. 1 shows a characteristic power curve of a generator with a global left side maximum.

FIG. 1 shows a characteristic curve of a partially shadowed photovoltaic generator or rather of a generator array. An area portion of the generator is less irradiated by the sun because of a shadow or for another reason.

The characteristic curve has two maxima (1) and (3). The right maximum (1) is referred to as the local maximum, whilst the left maximum (3) is referred to as the global maximum. The left (global) maximum (3) is greater than the right (local) maximum.

Using a conventional MPP Tracking, a local power maximum (1) may occur since the various power maxima cannot be distinguished. As a result, part of the solar energy is not made use of and the energy efficiency of the array drops considerably.

Conventional MPPT preferably operate, constantly tracking and moving around a local power maximum.

Global Left Side Maximum

The instance just discussed and the functioning of the invention will now be discussed in greater detail.

The invention makes use of a method for finding a power maximum of the photovoltaic generator in which MPP Tracking is utilized by means of which a maximum generator power is set at an operating point of the generator's characteristic curve.

As a result of MPP Tracking, the operating point is located at (1) and is not allowed to move but for a change in sun irradiation, cell temperature or the like.

In accordance with the invention, actual MPP Tracking is switched off. MPP Tracking and a voltage regulator are de-activated so to say. Only then will it be possible to displace the operating point. Next, the generator is loaded for a new operating point of the generator's characteristic curve to set. The desired value for the DC current is increased by a factor of 1.05 for example. Instability is thus created. The operating point migrates very fast toward the global maximum of an operating point (2) where it is stable again. Switched on again, MPP Tracking brings the system to the optimal operating point or to the global maximum (3).

Peak Maximum is Thus Obtained.

Local Left Side Maximum

Figure 2:
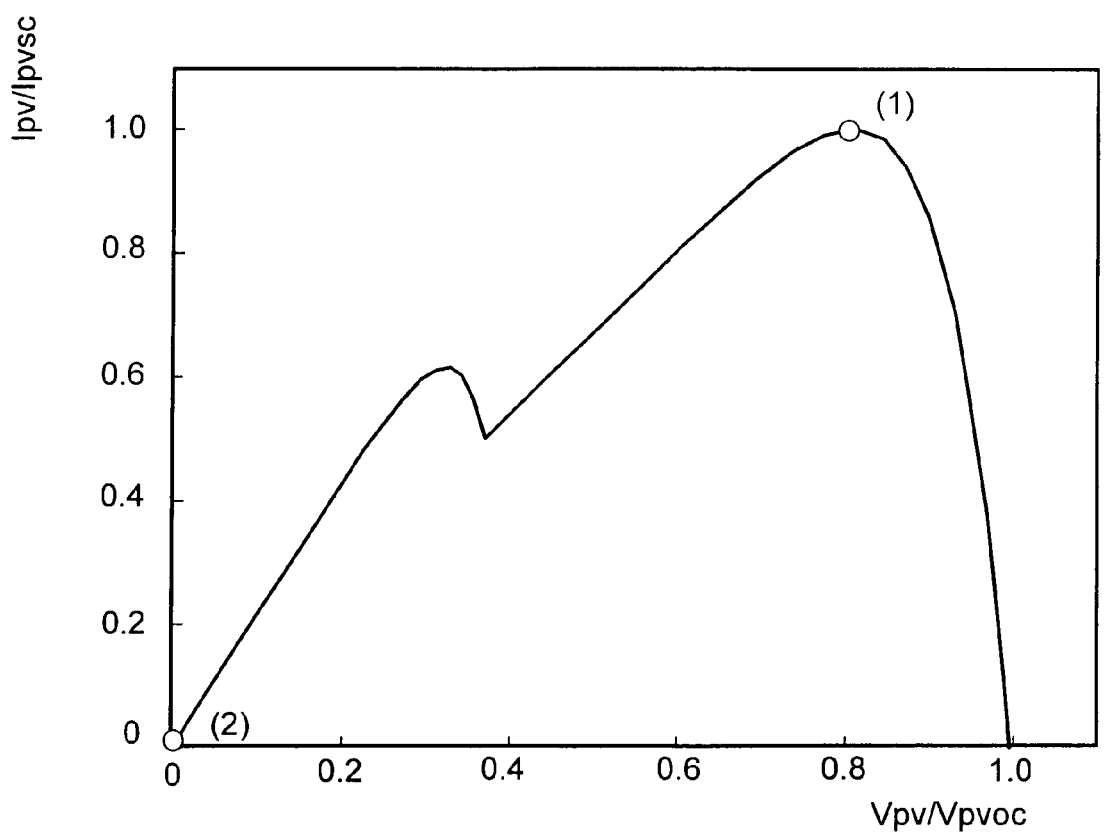
FIG. 2 shows a characteristic power curve of a generator with a local left side maximum.

FIG. 2 shows an instance in which the actual operating point is already at the global maximum (1), with another (smaller) maximum however existing on the left side thereof.

In this case also, MPP Tracking is first switched off. Under a load, the operating point however moves very fast on the characteristic curve toward the operating point (2) at which the current is higher, the voltage however collapses so that the generator has virtually no output.

Since the high imposed desired power cannot be set, no stable operating point is obtained.

There is preferably provided that a voltage limit is fixed, with the operating point jumping back or the generator being rather immediately unloaded again when the voltage falls below this limit.

Peak maximum is thus obtained.

Local Right Side Maximum

Figure 3:
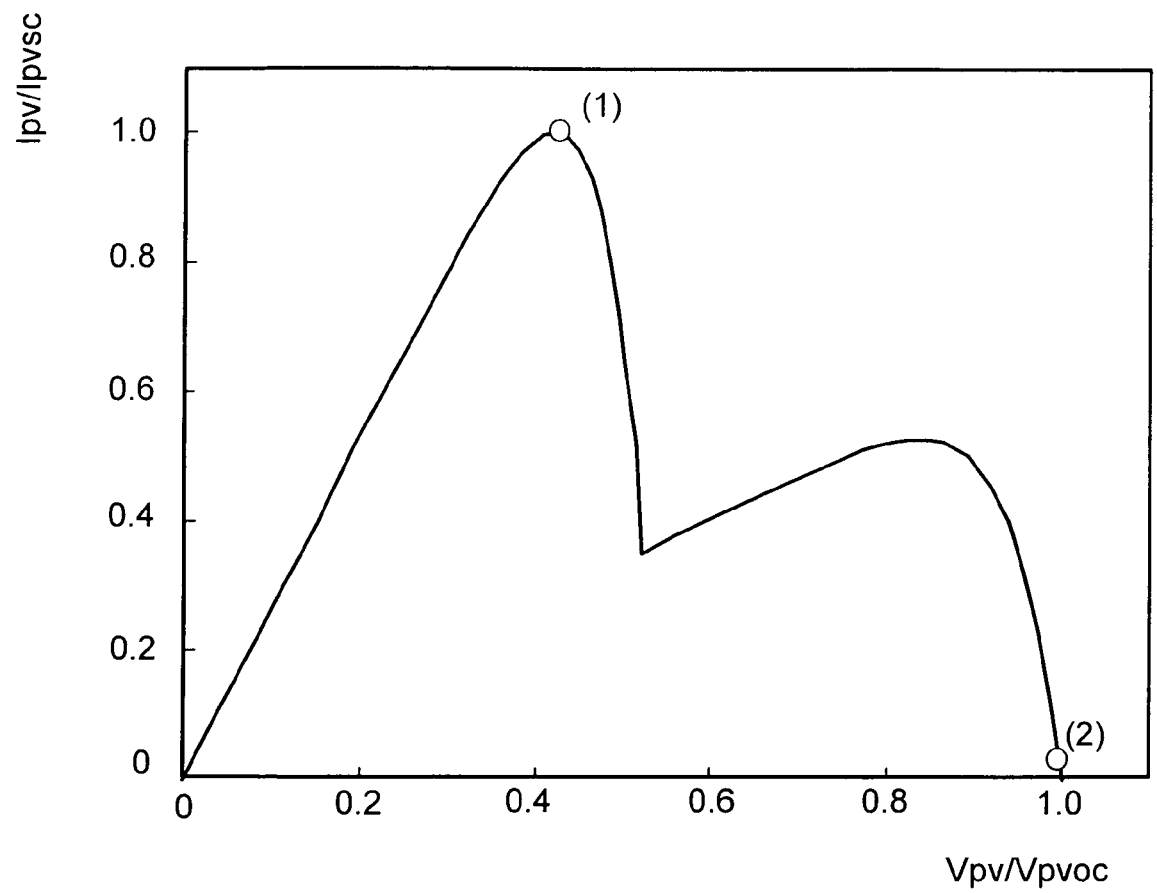
FIG. 3 shows a characteristic power curve of a generator with a local right side maximum.

FIG. 3 shows the instance in which MPP Tracking has already set to the global maximum (1). The actual operating point is already at (1). By de-activating MPP Tracking and subsequently unloading the generator, the operating point moves very fast on the characteristic curve until it reaches operating point (2) that is almost at idle voltage. If a new current load is applied, which corresponds to the power at operating point (1), the operating point returns to its initial position (1).

Peak maximum is thus maintained.

Global Right Side Maximum

Figure 4:
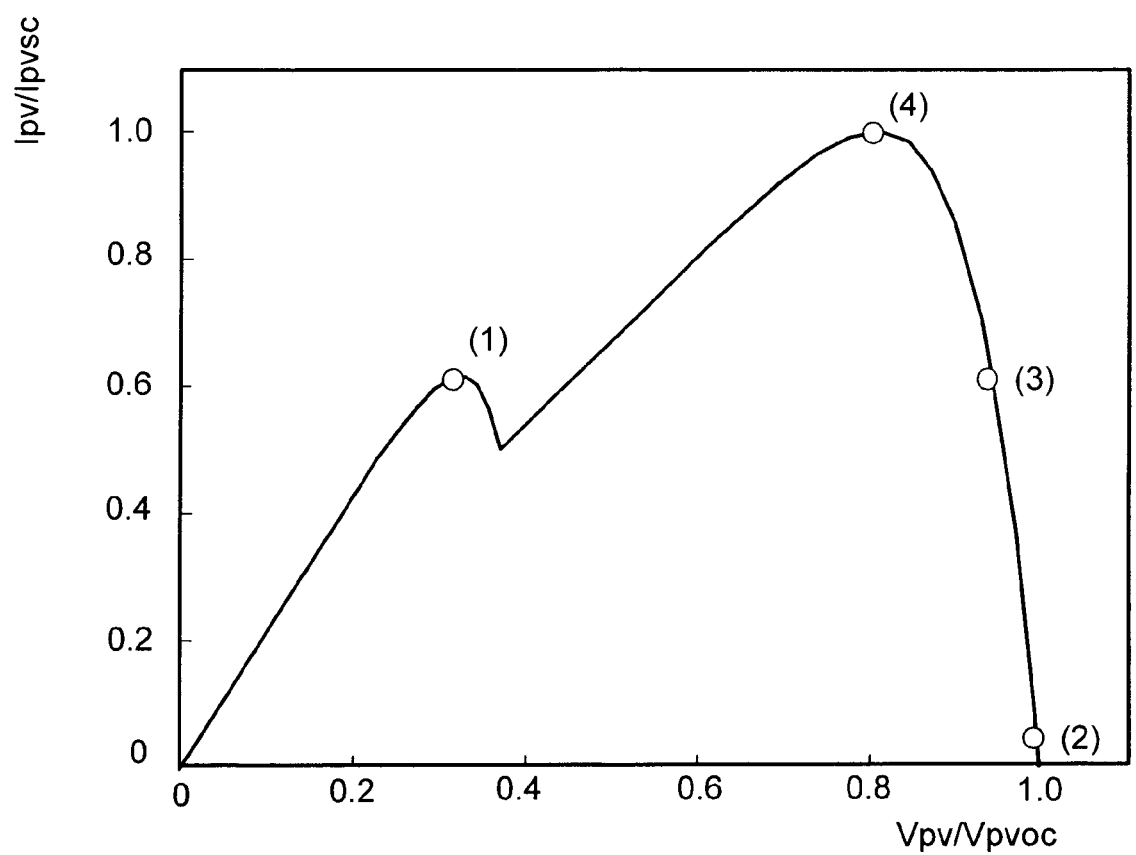
FIG. 4 shows a characteristic power curve of a generator with a global right side maximum.

FIG. 4 shows the instance in which there is a local maximum (1) on. the left, with MPP Tracking fixing this operating point. By de-activating MPP Tracking and subsequently unloading the generator, the new operating point (2) is set, which is near idle voltage. If a new current load, which corresponds to the power at operating point (1), is applied, the operating point moves to point (3). Switching the MPP tracker on again causes the global maximum (4) to set.

The peak power maximum is thus achieved.

Figure 5:
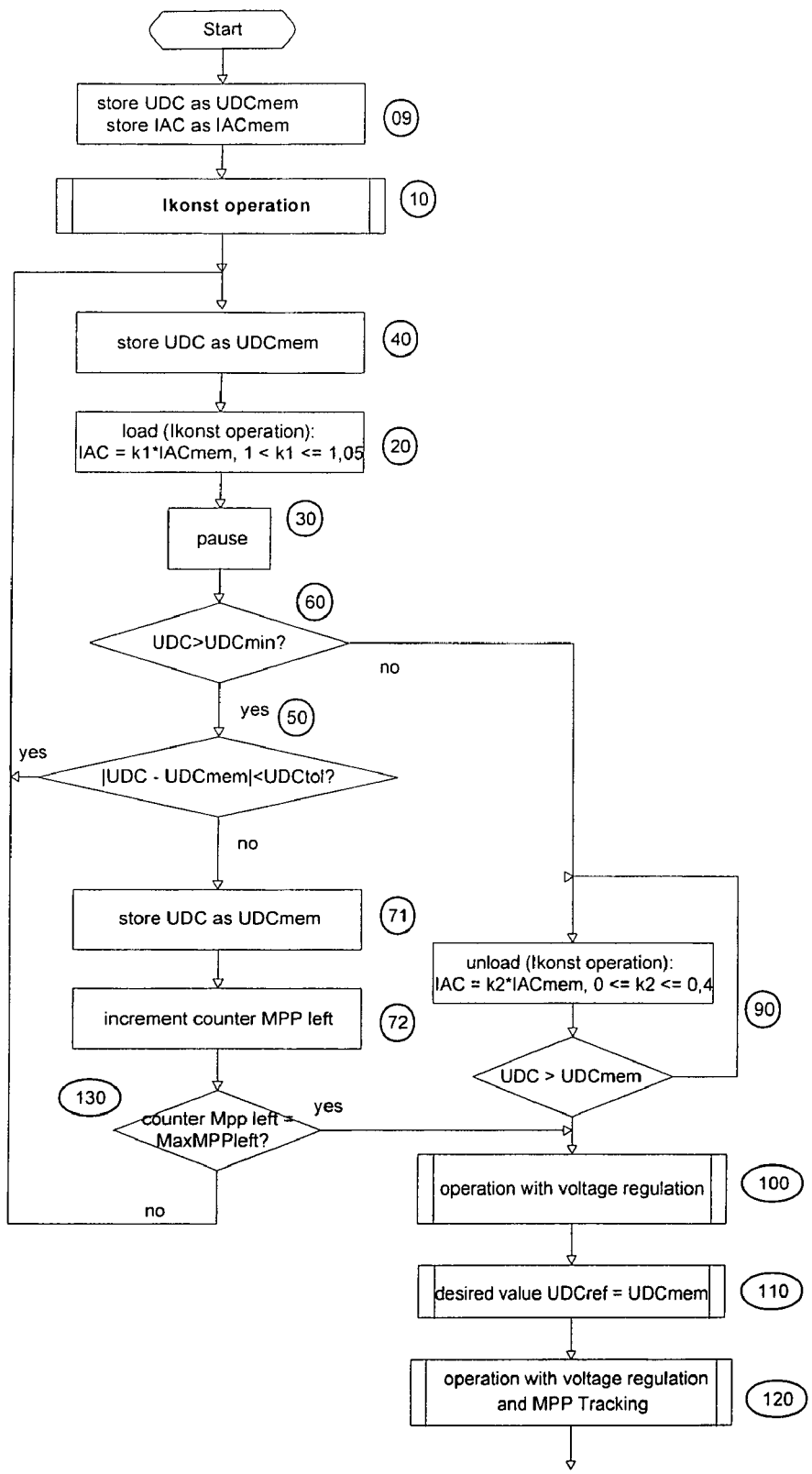
FIG. 5 shows a flow chart upon detection of a left side maximum.

FIG. 5 shows a flow chart for detecting a left side maximum. The initial point is the operating point (1) according to (1) or according to FIG. 3. In step 10, MPP-Tracking is de-activated. That is to say the mains current regulation operational mode "Ikonst" is adopted. Before that, the pairs of values for photovoltaic voltage UDC and mains current IAC are stored (step 9). In step 20, mains current or AC current (of the DC-AC converter) is increased so that the operating point is allowed to move from (1) to (2) according to FIG. 1. After a pause (step 30), it is checked whether the new operating point is near the old one (demand 50). If a stable operating point is set, the valid characteristic curve is e.g. a curve like in FIG. 1 (step 60). If no stable operating point is achieved, the voltage collapses and one has the case illustrated in FIG. 3. This case is detected in that the voltage UDC min is achieved (demand 60). If no new stable operating point according to FIG. 1 is set, there is instability and the voltage reaches the DC undervoltage limit. This procedure is very fast since the operating point exceeds the instability range.

If the new operating point exceeds the DC undervoltage limit, a new maximum has been detected and the voltage value is stored (step 71) and a counter incremented. A demand in step 130 may serve to limit the number of the maxima to be tracked.

If the new operating point is on the far right from the maximum (3), the next current increase (step 20) will not lead to another instability, which is acquired by the demand (step 50). The cycle (step 20, 30, 40, 50) proceeds until maximum (3) is exceeded.

Using the method of the invention, the operating point (1) according to FIG. 3 is maintained. After increasing the current in accordance with the invention (step 20), no additional stable operating point is found. The voltage drops quickly as far as the lowermost voltage limit, which is acquired by the demand in step 60. If this is the case, the system must be unloaded by suspending the DC-AC inverter (step 90). This causes the DC voltage to rise quickly again. Once the photovoltaic voltage has reached the last-stored voltage value, the voltage regulator is switched on and MPP-Tracking activated.

If left side tracking is interrupted by counter (130), the last stored stable photovoltaic voltage value (40) is imposed as the desired value for the voltage regulator (110), which is activated together with MPP-Tracking. The system adjusts to the global maximum (1) of the generator's characteristic curve (step 120).

Further, a left side tracking may also be described as follows.

Figure 7:
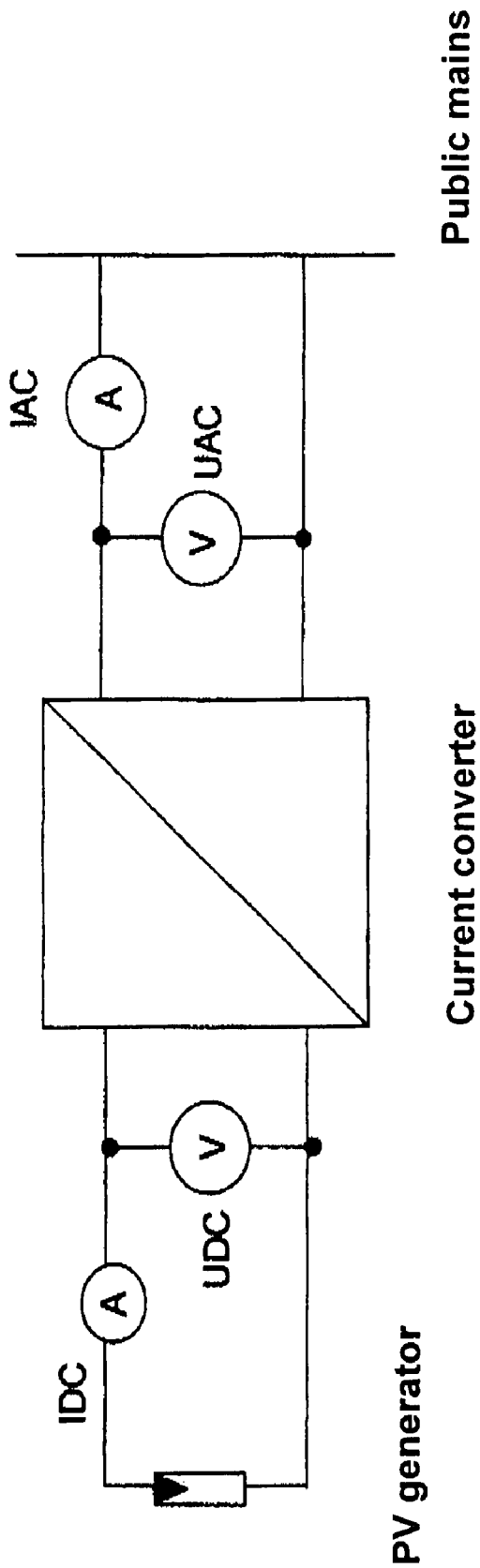
FIG. 7 shows an illustration of a mains-operated PV generator and FIG. 8 shows a flow chart for combined "right left" MPP Tracking.

At first, actual values for DC voltage and AC current (IAC) according to FIG. 7 are stored by means of sampling members or of a first S&H-stage (Sample & Hold) for IAC and a second S&H-stage for UDC. This corresponds to step 09. Next, the control loop is switched to the constant operation mode by means of a switch for example (step 10). The desired value for the power is increased. For this purpose, it is multiplied by a factor greater than one in the first S&H-stage (IAC) and this value is transmitted to the current regulator (step 20). After a pause, it is checked whether the DC voltage at the generator has fallen below the minimum allowable limit. This procedure is very fast since the DC voltage regulator and the MPP tracker are no longer active so that the DC voltage can no longer be kept stable. Using the S&H stages, a proportional element (0.9<K<1), a summing point and a comparator (not shown), it is ascertained whether the new operating point is near the old one (step 50). If this is not the case, the new operating point is near a local or global maximum that is greater than the local maximum at which the operating point is was located before and the comparator output increments a counter that has not been illustrated (MPP left). If the number of left side maxima to be tracked is limited, i.e., if the maximum count of the counter "MPP left" has been reached, the value stored in the second S&H stage (UDC) is transmitted to the voltage regulator and to the MPP tracker by switching the switch. By further switching the switch, the control loop is closed again. In this circuit, each operating point on the generator's characteristic curve can be set to be stable.

Accordingly, the following is performed in the steps shown in FIG. 5: step 9: first and second S&H stage (IAC, UDC) are activated. step 10: the switch is switched to a position "B" step 40: the second S&H stage (UDC) is activated. step 20: the mains current IAC is increased or the value of the first S&H stage (IAC) is multiplied by K=1.05 for example. step 50: the value stored in the second S&H stage (UDC) is compared by the comparator. step 71: the second S&H stage is activated. step 100: the switch is switched (e.g., to position "A"). step 101: the switch is switched to a third position (e.g. switch position "F").

Figure 6:
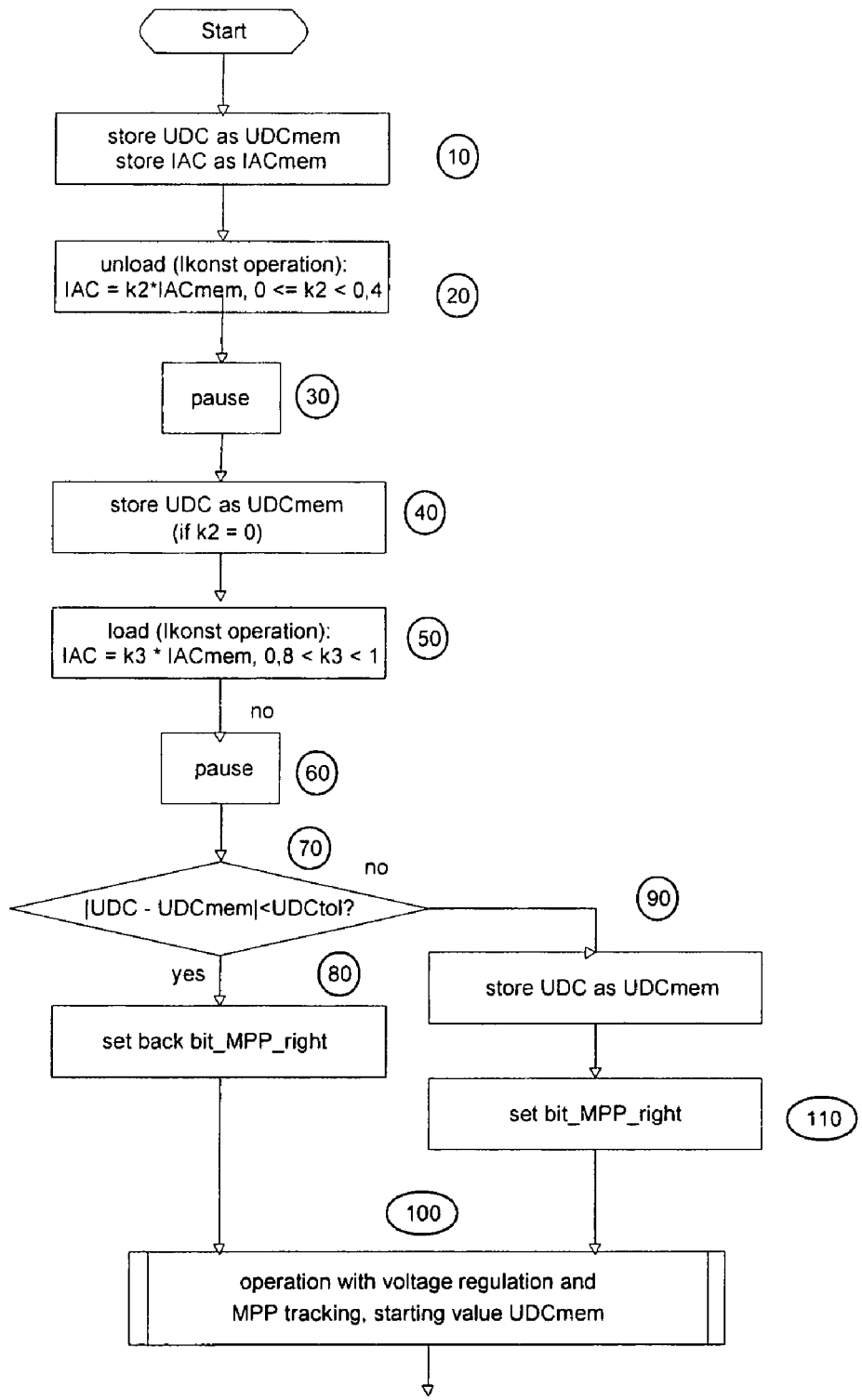
FIG. 6 shows a flow chart upon detection of a right side maximum.

FIG. 6 shows detection of a right side maximum according to FIG. 2 and FIG. 4. Here also, MPP-Tracking and voltage regulation are first de-activated so as to allow leaving the stable operating point (1). Again, the mains current regulation operational mode "Ikonst" is adopted, but the current is lower, more specifically 0-0.4 IAC. Before that, the pairs of values for photovoltaic voltage UDC and for the mains current IAC are stored. As shown in FIG. 2, the generator reaches the idle point (2) when a small current of near zero is imposed. In step 50, the generator is loaded again so that, in the case of FIG. 2, the operating point (1) is set again.

As a result, there is no other maximum and the right side tracking is discontinued.

Otherwise, in current-regulated operation, the system is loaded with current measured near the operating point (1) (step 50). If a maximum is found, which is greater than the old local maximum, the counter is set (step 110) and the voltage regulator or MPPT is activated (step 100). If a new operating point is set near the old operating point (1), no other maximum is present on the right and the counter is set back.

Further, a right side tracking can be described as follows with reference to FIG. 6.

The MPP tracker first is at a local or global maximum. Next, an instability is produced. Actual measurement values for DC voltage (UDC) and for AC current (IAC) are also stored in the sample holding members or S&H stages for IAC and UDC (step 10, MPP Tracking "right"). Now, the control loop is switched to constant-current operation by means of a switch. Now, the desired value for the power is clearly reduced. For this purpose, the value stored in the S&H stage for IAC is multiplied by a factor near zero and transmitted to a current regulator (step 20). If a factor of K2=0 is chosen, the idle voltage can be stored after that.

The desired value for the power is now brought approximately to the old value. For this purpose, the value stored in the S&H stage is multiplied by a factor near one and transmitted to the current regulator (step 50).

After another pause, it is checked whether the new DC voltage obtained at the generator is far from the old operating point. If the new voltage value is near the old voltage value, there is no other right side maximum that is greater than the previously found old maximum. This is detected with the aid of a circuit combination composed of the S&H stage for UDC, a proportional element 0.9<K<1.1, a summing point and a comparator (step 70, "right side" MPP Tracking in the flow chart according to FIG. 6).

Otherwise, i.e., when the new operating point is not near the old one, a new operating point is obtained near a new power maximum that is greater than the old one. This is detected with the aid of the combination composed of the S&H stage, the proportional element with the proportional coefficient 0.9<K5<1.1, the summing point and the comparator (see step 70, "right side" MPP Tracking in the flow chart, FIG. 6). The comparator output increments a counter "MPP right" (see step 110). Finally, the switch is switched and the new voltage value is transmitted to the voltage regulator and to the MPP tracker. The original control loop is closed again by switching to another switch position. In this switch position, each operating point of the generator characteristic curve can be set to be stable.

Figure 8:
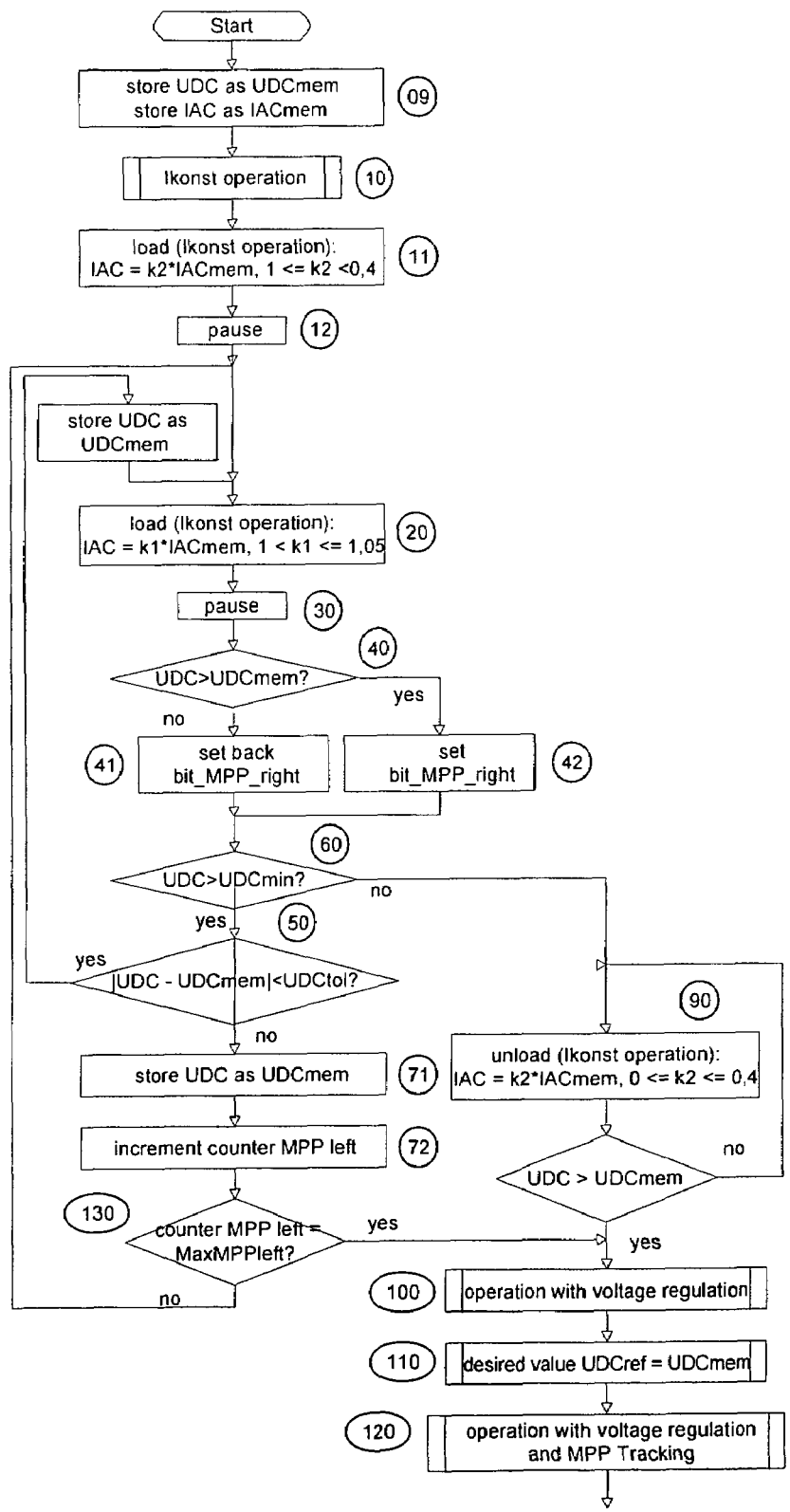

FIG. 8 shows a variant in which "right side" MPP-Tracking and "left side" MPP-Tracking are realised with only one regulator structure.

We claim:

1. A method of finding a power maximum of a photovoltaic generator, using MPP regulation of a power converter by means of which a maximum generator power is set at an operating point of the generator's characteristic curve, wherein the MPP regulation is switched off in order to find a plurality of power maxima due to partial shadowing effects and wherein the MPP regulation is switched off in order to then load and/or unload the generator and that the MPP regulation is next switched on again in order to bring the operating point of the generator's characteristic curve from a stable condition into an instable condition and vice versa, wherein the instable condition is performed in that way, that a new operating point that is arranged near to a local or global maximum is provided nearly without delay.

2. The method as set forth in claim 1,
wherein after the MPP regulation has been switched off, the power of the power converter is increased so that a first operating point of a power characteristic curve, which corresponds to a local maximum, moves toward a second operating point located between the first operating point and a third operating point and near said third operating point, said third operating point being a global maximum.

3. The method as set forth in claim 1,
wherein after the MPP regulation has been switched off, the power of the power converter is increased so that a first operating point of a power characteristic curve, which corresponds to a global maximum, moves toward a second operating point located near point zero of the characteristic curve.

4. The method as set forth in claim 3,
wherein the generator is unloaded again when the voltage falls below a limit.

5. The method as set forth in claim 1,
wherein after the MPP regulation has been switched off, the power of the power converter is reduced so that a first operating point of a power characteristic curve, which corresponds to a local maximum, moves toward a second operating point located near the generator's idle voltage.

6. The method as set forth in claim 1,
wherein after the MPP regulation has been switched off, the power of the power converter is reduced so that a first operating point of a power characteristic curve, which corresponds to a local maximum, moves toward a second operating point located near the generator's idle voltage, a third operating point occurring after the current has been increased, said third operating point being as high as the first operating point and near a fourth operating point, which is a global maximum.

7. The method as set forth in claim 1,
wherein the generator voltage is stored.

8. A method of finding a power maximum of a partially shadowed photovoltaic generator having multiple maximum power points, comprising the steps of
setting a first operating point of the photovoltaic generator at a first maximum power point using an MPP regulator of an inverter;
switching off the MPP regulator;
loading or unloading the photovoltaic generator by a predetermined factor by adjusting the output current of the inverter; and turning on the MPP regulator.

9. The method as set forth in claim 8, further comprising
pausing after loading or unloading the photovoltaic generator;
determining whether a new operating point achieves a stable operating point after pausing;
reversing the loading or unloading of the photovoltaic generator if in the step of determining it is determined that the new operating point does not achieve a stable operating point;
skipping to the step of turning on the MPP regulator after the step of reversing if the step of reversing is performed;
calculating whether the new operating point is near the first operating point;
incrementing a counter if in the step of calculating it is determined that the new operating point is not near the first operating point.

10. The method as set forth in claim 9, further comprising the step of repeating the steps of loading or unloading, pausing, determining, calculating and incrementing until the counter reaches a maximum value or the steps of reversing and skipping are performed.

11. The method as set forth in claim 10, further comprising the following steps before the step of switching off the MPP regulator measuring a voltage across output terminals of the photovoltaic generator;
storing a value of the voltage measured across output terminals of the photovoltaic generator in a first memory location;
measuring a current from an output terminal of the inverter connected to the output terminals of the photovoltaic generator; and
storing a value of the current measured from an output terminal of a power converter connected to the output terminals of the photovoltaic generator in a second memory location.

* * * * *